US008926166B2

(12) United States Patent
Yoshida et al.

(10) Patent No.: US 8,926,166 B2
(45) Date of Patent: Jan. 6, 2015

(54) KNEADING ROTOR, BATCH KNEADER AND METHOD OF KNEADING MATERIALS

(75) Inventors: Norifumi Yoshida, Takasago (JP); Masaaki Uemura, Takasago (JP); Hiromi Nakano, Takasago (JP); Katsunobu Hagiwara, Takasago (JP); Kimio Inoue, Takasago (JP); Mika Nishida, Kobe (JP); Kazuhisa Fukutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 909 days.

(21) Appl. No.: 13/129,038

(22) PCT Filed: Jan. 13, 2010

(86) PCT No.: PCT/JP2010/050267
§ 371 (c)(1),
(2), (4) Date: May 12, 2011

(87) PCT Pub. No.: WO2010/082580
PCT Pub. Date: Jul. 22, 2010

(65) Prior Publication Data
US 2011/0222364 A1    Sep. 15, 2011

(30) Foreign Application Priority Data

Jan. 19, 2009   (JP) ................................. 2009-008447

(51) Int. Cl.
*B29B 7/18*      (2006.01)
*B29B 7/24*      (2006.01)

(52) U.S. Cl.
CPC ................. *B29B 7/186* (2013.01); *B29B 7/246* (2013.01)
USPC ........................................... 366/97; 366/76.7

(58) Field of Classification Search
USPC ............ 366/76.1, 76.2, 76.93, 76.7, 76.8, 77, 366/96, 97, 142, 189, 192, 194–196; 425/204, 208, 209
See application file for complete search history.

(56) References Cited

U.S. PATENT DOCUMENTS 1,936,248 A * 11/1933 Stromer et al. ................. 366/91
4,058,297 A * 11/1977 Seufert ............................ 366/81
(Continued)

FOREIGN PATENT DOCUMENTS

CN        1185371 A     6/1998
EP        0 264 224 A2  4/1988
(Continued)

OTHER PUBLICATIONS

Taiwanese Office Action issued Mar. 28, 2013, in Taiwan Patent Application No. 099101088 (with English translation).
(Continued)

*Primary Examiner* — Charles Cooley
(74) *Attorney, Agent, or Firm* — Oblon, Spivak, McClelland, Maier & Neustadt, L.L.P.

(57) ABSTRACT

Provided is a kneading rotor, a batch kneader and a method of kneading materials capable of obtaining kneaded materials with higher quality in comparison to conventional kneaded materials when the materials to be kneaded are kneaded in a high temperature state. The kneading rotor comprises a rotor portion which is disposed in a kneading chamber of a chamber of a batch kneader, and applies shear force, by using a plurality of kneading blades, to materials to be kneaded which pass through a tip clearance. A first long blade of the plurality of kneading blades has an apex for forming, with the inner surface of the chamber forming the kneading chamber, three-staged tip clearances of different sizes configured from a combination of a large tip clearance, a mid tip clearance that is smaller than the large tip clearance, and a small tip clearance that is smaller than the mid tip clearance so as to be arranged in the longitudinal direction of the first long blade. Each of a second long blade, a first short blade and a second short blade of the plurality of kneading blades has an apex for forming, with the inner surface of the chamber forming the kneading chamber, a tip clearance of a size that is larger than or equal to the small tip clearance and smaller than or equal to the large tip clearance.

6 Claims, 6 Drawing Sheets

(56) References Cited

U.S. PATENT DOCUMENTS

| | | | | |
|---|---|---|---|---|
| 4,084,263 A | * | 4/1978 | Millauer | 366/84 |
| 4,234,259 A | * | 11/1980 | Wiedmann et al. | 366/81 |
| 4,284,358 A | * | 8/1981 | Sato et al. | 366/97 |
| 4,300,838 A | * | 11/1981 | Sato et al. | 366/84 |
| 4,456,381 A | * | 6/1984 | Inoue et al. | 366/97 |
| 4,714,350 A | * | 12/1987 | Nortey | 366/84 |
| 4,718,771 A | * | 1/1988 | Asai et al. | 366/97 |
| 4,744,668 A | * | 5/1988 | Nortey | 366/76.7 |
| 4,834,543 A | * | 5/1989 | Nortey | 366/97 |
| 4,893,936 A | * | 1/1990 | Borzenski et al. | 366/76.7 |
| 5,044,760 A | * | 9/1991 | Asai | 366/97 |
| 5,297,935 A | * | 3/1994 | Passoni | 416/183 |
| 5,520,455 A | * | 5/1996 | Yamada et al. | 366/97 |
| 5,672,006 A | * | 9/1997 | Hanada et al. | 366/84 |
| 5,791,776 A | * | 8/1998 | Takakura et al. | 366/84 |
| 5,984,516 A | * | 11/1999 | Inoue et al. | 366/97 |
| 6,402,360 B1 | * | 6/2002 | Nortey | 366/85 |
| 6,494,607 B2 | * | 12/2002 | Valsamis et al. | 366/84 |
| 6,811,295 B2 | * | 11/2004 | Koro et al. | 366/97 |
| 6,913,379 B2 | * | 7/2005 | Otsuka et al. | 366/76.7 |
| 7,556,420 B2 | * | 7/2009 | Limper et al. | 366/84 |
| 7,854,542 B2 | * | 12/2010 | Inoue et al. | 366/97 |
| 2001/0036123 A1 | * | 11/2001 | Koro et al. | 366/84 |
| 2002/0163852 A1 | * | 11/2002 | Valsamis et al. | 366/84 |
| 2006/0098527 A1 | * | 5/2006 | Limper et al. | 366/97 |
| 2006/0104154 A1 | * | 5/2006 | Inoue et al. | 366/96 |

FOREIGN PATENT DOCUMENTS

| | | | | |
|---|---|---|---|---|
| EP | 0 264 224 A3 | | 4/1988 | |
| EP | 729816 A1 | * | 9/1996 | B29B 7/18 |
| EP | 1 149 673 A1 | | 10/2001 | |
| JP | 4 276406 | | 10/1992 | |
| JP | 8 229938 | | 9/1996 | |
| JP | 09216224 A | * | 8/1997 | B29B 7/18 |
| JP | 10 151334 | | 6/1998 | |
| JP | 11 48239 | | 2/1999 | |
| JP | 11188249 A | * | 7/1999 | B01F 7/08 |
| JP | 2002-11336 | | 1/2002 | |
| JP | 2005 144703 | | 6/2005 | |
| JP | 2005 199503 | | 7/2005 | |
| JP | 2005-199503 | | 7/2005 | |
| JP | 2006 123272 | | 5/2006 | |
| JP | 2006 142616 | | 6/2006 | |
| JP | 2006 218691 | | 8/2006 | |
| JP | 3980841 | | 9/2007 | |
| JP | 2004 530543 | | 10/2007 | |
| SU | 1109317 A | | 8/1984 | |

OTHER PUBLICATIONS

Office Action issued May 6, 2013 in Chinese Patent Application No. 201080004752.5 (with English translaiton).
International Search Report issued Feb. 9, 2010 in PCT/JP10/050267 filed Jan. 13, 2010.
U.S. Appl. No. 13/259,954, filed Sep. 23, 2011, Yoshida, et al.
Office Action issued Nov. 7, 2012 in Korean Patent Application No. 10-2011-7016647 (with English-language translation).
Extended European Search Report issued on Apr. 17, 2013 in the corresponding European Application No. 10731249.8.
Canadian Office Action issued Apr. 9, 2013, in Canada Patent Application No. 2,742,730.
International Preliminary Report on Patentability and Written Opinion issued Aug. 16, 2011, in International Application No. PCT/JP2010/050267 (International filing date Jan. 13, 2010).

* cited by examiner

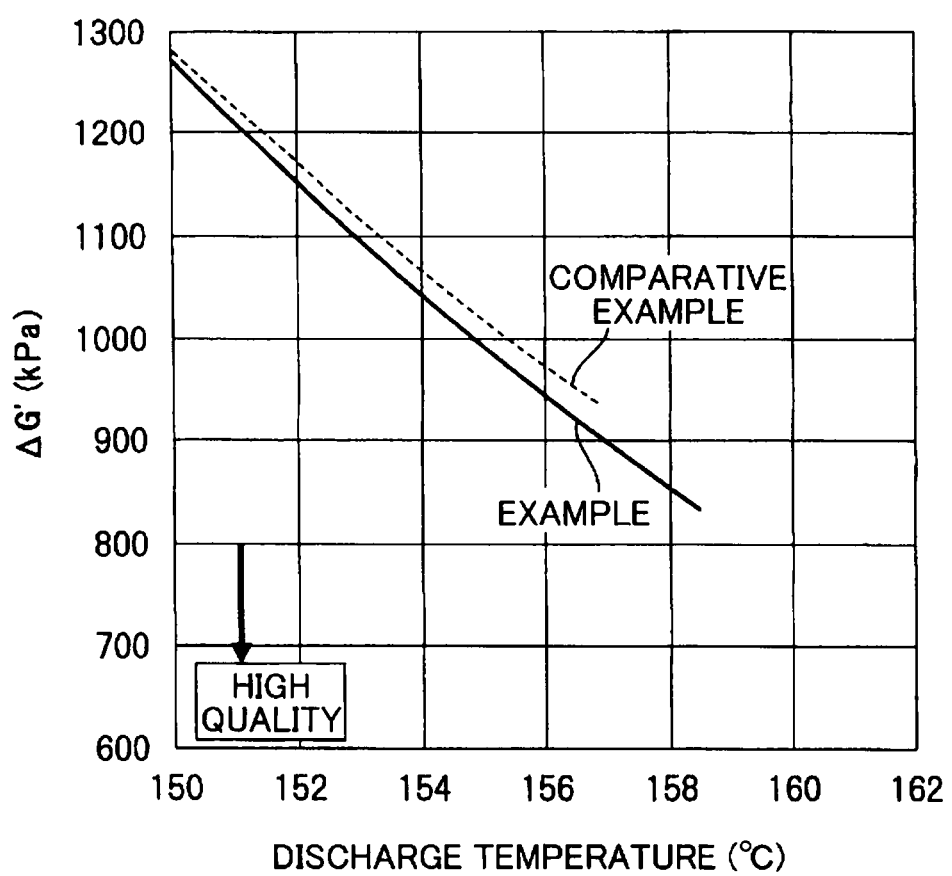

KNEADING ROTOR, BATCH KNEADER AND METHOD OF KNEADING MATERIALS

TECHNICAL FIELD

The present invention relates to a kneading rotor and a batch kneader for kneading polymeric materials such as plastic and rubber, as well as to a method of kneading such materials.

BACKGROUND ART

A batch kneader is a kneader for producing one batch worth of kneaded materials by performing a series of operations including the steps of kneading polymeric materials (materials to be kneaded) such as rubber and plastic which are placed in a kneading chamber through a hopper unit and sealed inside such kneading chamber at a prescribed pressure using a pair of kneading rotors provided in the kneading chamber, and thereafter externally discharging the kneaded materials in an intended kneaded state. Here, among the parts configuring the batch kneader, the kneading rotor is a key part for kneading the materials to be kneaded. Conventionally, for instance, the following types of technologies concerning a kneading rotor have been proposed.

Applicant has previously proposed a kneading rotor comprising a nonlinear blade in which the developed shape from the starting point to the ending point becomes nonlinear when developed in a planar state around an axis (for instance, refer to Patent Document 1). The kneading rotor described in Patent Document 1 is a four-blade rotor comprising a total of four blades; specifically, two long blades and two short blades. One blade among the four blades of this kneading rotor is the foregoing nonlinear blade (long blade), and the remaining three blades are linear blades in which the developed shape thereof becomes linear. With the kneading rotor described in Patent Document 1, the mixing and dispersion of the materials to be kneaded can be balanced efficiently as a result of the existence of the nonlinear blade and, consequently, kneading can be appropriately controlled so that the mixing of the materials to be kneaded and the dispersion of prescribed materials in the materials to be kneaded can be performed concurrently.

In addition, a different applicant proposed a kneading rotor comprising a total of four blades; specifically, two long blades which are both linear blades having different twist angle and two short blades which are both linear blades having different twist angle (for instance, refer to Patent Document 2). According to the kneading rotor of Patent Document 2, the materials to be kneaded can be subject to favorable distributive and dispersive mixing and, consequently, the discharge temperature of the kneaded materials can be controlled to be a lower temperature, and it is possible to obtain a more homogeneous kneaded material.

Nevertheless, if the kneading rotor described in Patent Document 1 is used to knead materials to be kneaded to which, for example, large amounts of silica are added (compounded) thereto, the ΔG' value as the dispersion index of silica did not become a favorable value. Here, the ΔG' value is, among the storage elastic modulus obtained from the viscoelastic property of the unvulcanized rubber composition, the difference between the value at the time the rubber composition generated small strain and the value at the time the rubber composition generated large strain, and is an index that is used for determining the quality of the kneaded materials. The smaller the ΔG' value, the better the quality of the kneaded materials. When kneading the materials to be kneaded which are compounded with silica, the silane coupling agent that is compounded for bonding silica and rubber will react with silica when the temperature of the kneaded materials is in a range of, for example, 140° C. to 160° C. Therefore, in order to cause a favorable reaction, it is necessary to sufficiently and evenly knead silica and the silane coupling agent in a temperature range of approximately 140° C. to 160° C. Kneading that is performed in a temperature range of approximately 140° C. to 160° C. corresponds to kneading of a rubber-based composition in a high temperature state.

The key feature of the kneading rotor described in Patent Document 2 is that the twist angle of the two long blades is mutually different. Nevertheless, even with the kneading rotor comprising the nonlinear blade described in Patent Document 1, the twist angle in most parts of the two long blades is mutually different. Specifically, the kneading rotor described in Patent Document 2 is similar to the kneading rotor described in Patent Document 1 in terms of the configuration and arrangement of the blades. Thus, even if the kneading rotor described in Patent Document 2 is used, it can hardly be said that favorable kneaded materials can be obtained as a result of kneading the materials to be kneaded, to which large amounts of silica have been added, in a high temperature state.

Patent Document 1: Japanese Patent No. 3980841
Patent Document 2: Japanese Unexamined Patent Application No. 2004-530546

SUMMARY OF THE INVENTION

Thus, an object of this invention is to provide a kneading rotor, a batch kneader, and a method of kneading materials capable of overcoming the foregoing problems.

Another object of this invention is to provide a kneading rotor, a batch kneader, and a method of kneading materials capable of obtaining kneaded materials with higher quality in comparison to conventional kneaded materials even when the materials to be kneaded are kneaded in a high temperature state.

A kneading rotor according to one aspect of the present invention is a kneading rotor inserted rotatably into a kneading chamber of a chamber of a batch kneader, and comprises a rotor portion which has a plurality of kneading blades on its peripheral surface, is disposed in the kneading chamber so as to form a tip clearance between apexes of the kneading blades and an inner surface of the chamber forming the kneading chamber, and applies shear force, by using the kneading blades, to materials to be kneaded which pass through the tip clearance. With this kneading rotor, the plurality of kneading blades include a first long blade and a second long blade having a length that is larger than half the length of the rotor portion in the axial direction of that rotor portion and twisted in a mutually reverse direction and in a direction that enables materials to be kneaded to flow toward the center side of the rotor portion in the axial direction in accordance with the axial rotation of the rotor portion, and a first short blade and a second short blade having a length that is smaller than half the length of the rotor portion in the axial direction of that rotor portion and twisted in a mutually reverse direction and in a direction that enables materials to be kneaded to flow toward the center side of the rotor portion in the axial direction in accordance with the axial rotation of the rotor portion. Moreover the first short blade is a linear blade that is disposed behind the first long blade in the rotational direction of the rotor portion, and has a developed shape of extending from one end side of the rotor portion in the axial direction to the center side of that rotor portion in the axial direction in a developed shape of the rotor portion in a case where that rotor portion is developed in a planar state around its axis. Further, the second short blade is a linear blade that is disposed behind the second long blade in the rotational direction of the rotor portion, and has a developed shape of extending from the other end side of the rotor portion in the axial direction to the center side of that rotor portion in the axial direction in the developed shape of the rotor portion. In addition, the first long blade has an apex for forming, with the inner surface of the chamber forming the kneading chamber, three-staged tip clearances of different sizes configured from a combination of a large tip clearance, a mid tip clearance that is smaller than the large tip clearance, and a small tip clearance that is smaller than the mid tip clearance so as to be arranged in the longitudinal direction of the first long blade. Moreover, each of the second long blade, the first short blade and the second short blade has an apex for forming, with the inner surface of the chamber forming the kneading chamber, a tip clearance of a size that is larger than or equal to the small tip clearance and smaller than or equal to the large tip clearance.

BRIEF DESCRIPTION OF THE DRAWINGS

FIG. 7 is a graph showing the kneading results of the materials to be kneaded based on the kneading rotor shown in FIG. 2 according to an embodiment of the present invention and the kneading rotor according to a Comparative Example.

DESCRIPTION OF EMBODIMENTS

Embodiments of the present invention are now explained with reference to the attached drawings.
(Configuration of Batch Kneader)

Figure 1:
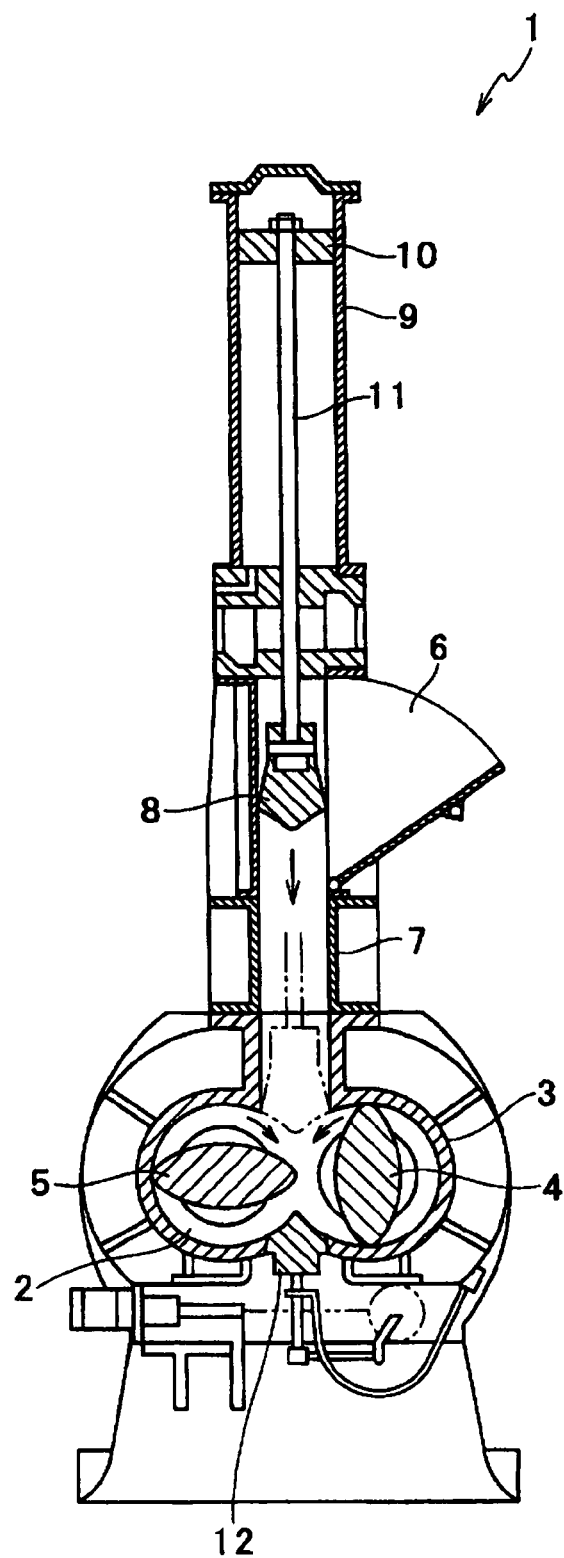
FIG. 1 is a front cross section of a batch kneader comprising a kneading rotor according to an embodiment of the present invention.
Figure 2:
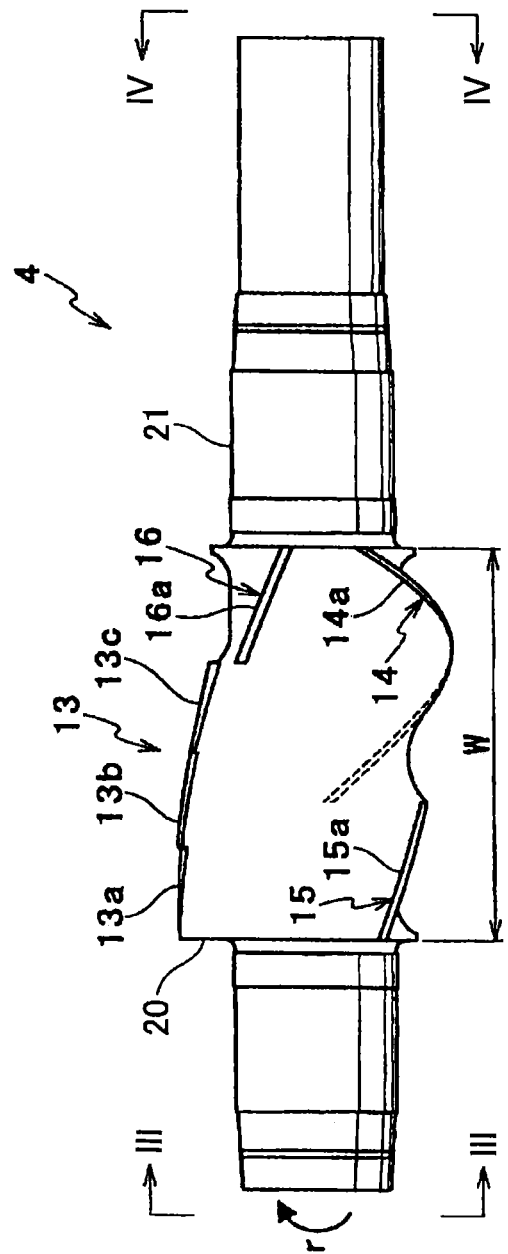
FIG. 2 is a front view of the kneading rotor shown in FIG. 1.
Figure 3:
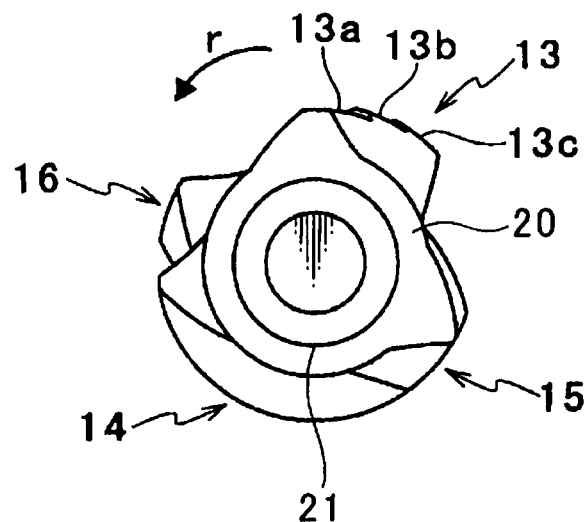
FIG. 3 is an arrow view of the kneading rotor shown in FIG. 2 seen in the III-III direction.
Figure 4:
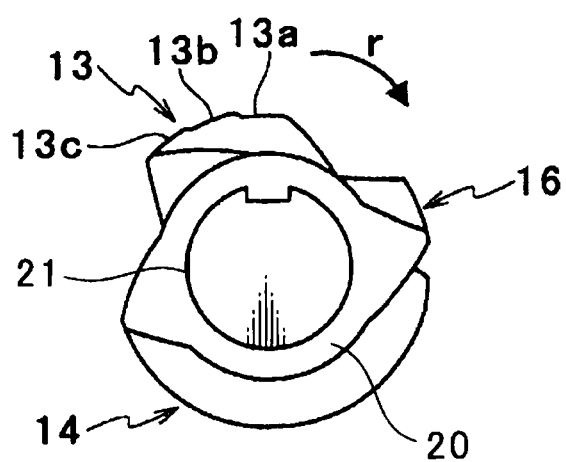
FIG. 4 is an arrow view of the kneading rotor shown in FIG. 2 seen in the IV-IV direction.

A hermetically sealed batch kneader (also known as a hermetically sealed kneader) 1 according to an embodiment of this invention is now explained with reference to FIG. 1. As shown in FIG. 1, the batch kneader 1 of this embodiment comprises a chamber 3 including a kneading chamber 2, a pair of left and right kneading rotors 4, 5, a material supply pipe 7 with a hopper 6, a floating weight 8, a pneumatic cylinder 9, a piston 10, a piston rod 11, a drop door 12, and a rotary actuator.

The kneading chamber 2 is formed to have a cocoon-shaped cross section shape in a vertical cross section (cross section that is perpendicular to the longitudinal direction). Specifically, the kneading chamber 2 is formed in a shape where a pair of left and right kneading spaces having an approximately circular cross section is joined by the kneading spaces partially overlapping with each other in the radial direction. Each of the kneading rotors 4, 5 is inserted into the corresponding kneading space of the kneading chamber 2. Each of the kneading rotors 4, 5 is provided rotatably around its own axis in the corresponding kneading space. An opening is formed at the upper part of the chamber 3 for causing the kneading chamber 2 to be in communication with the outside of the chamber 3. The material supply pipe 7 is mounted on the opening of the chamber 3 and further erected on the chamber 3. The floating weight 8 is provided to move freely in the vertical direction in the material supply pipe 7.

The pneumatic cylinder 9 is connected to the upper part of the material supply pipe 7. The piston 10 is provided to move freely in the vertical direction in the pneumatic cylinder 9. The piston rod 11 penetrates a lower cover of the cylinder 9 and extends in the vertical direction. The portion where the piston rod 11 penetrates the lower cover of the cylinder 9 is configured to so that the inside of the cylinder 9 is maintained in a hermetically sealed state. The piston 10 and the floating weight 8 are connected via the piston rod 11. Thus, when the space which is located above the piston 10 in the pneumatic cylinder 9 is pressurized, the piston 10, the piston rod 11 and the floating weight 8 will descend integrally. Then, as a result of the descending floating weight 8, it is possible to force the materials to be kneaded, which were supplied into the material supply pipe 7 via the hopper 6, into the chamber 3 (into the kneading chamber 2). Moreover, the bottom part of the chamber 3 is provided with an outlet. The drop door 12 is provided to the bottom part of the chamber 3, and is able to freely open and close the outlet. The drop door 12 opens and closes the outlet by being driven with a rotary actuator. As a result of driving the drop door 12, which had the outlet closed, to open the outlet, the kneaded materials (materials that have been subject to kneading) which were kneaded for a given period of time in the kneading chamber 2 can be discharged outside of the machine through the outlet. Incidentally, the batch kneader 1 of this embodiment is a non-engaging kneader in which the pair of left and right kneading rotors 4, 5 is not mutually engaged.
(Kneading Rotor)

The configuration of the kneading rotors 4, 5 is now explained with reference to FIG. 1 to FIG. 6.

The kneading rotors 4, 5, as shown in FIG. 1, are arranged at a prescribed spacing in the width direction (horizontal direction in FIG. 1) of the chamber 3. The kneading rotors 4, 5 are able to rotate in mutually different directions so that the mutually facing parts of the kneading rotors 4, 5 move downward. The kneading rotors 4, 5 respectively comprise a rotor portion 20 and a shaft 21, which are provided integrally. The rotor portion 20 is disposed at the center part of the kneading rotor 4 in the axial direction. The shaft 21 extends from both ends of the rotor portion 20 in the axial direction, and is disposed concentrically with the rotor portion 20. The kneader 1 comprises a drive source not shown, and the kneading rotors 4, 5 are able to rotate around their respective axes as a result of driving force being supplied from the drive source to the shaft 21.

The rotor portion 20 has a plurality of kneading blades 13 to 16 on its peripheral surface. The rotor portion 20 is disposed in the kneading space so that a gap (tip clearance) will be formed between the apex of the kneading blades 13 to 16 and the inner surface of the chamber 3 which forms the kneading space of the kneading chamber 2. The rotor portion 20 applies shear force using the kneading blades 13 to 16 to the materials to be kneaded which pass through the tip clearance in accordance with the axial rotation of the rotor portion 20. The plurality of kneading blades 13 to 16 are twisted in a spiral shape in relation to the axis of the rotor portion 20. When the rotor portion 20 rotates around the axis, the materials to be kneaded will be pushed in the axial direction of the rotor portion 20 by the kneading blades 13 to 16 as a result of the kneading blades 13 to 16 being twisted as described above. Consequently, the materials to be kneaded will flow in the axial direction of the rotor portion 20. The materials to be kneaded will move between both rotor portions 20 in accordance with the rotation of the rotor portions 20 of both kneading rotors 4, 5, and, consequently, the evenness of the materials to be kneaded will improve and the dispersion effect will also progress evenly. Incidentally, the term "tip clearance" refers to the gap between the apexes (tip portions) 13a to 16a as the apical surface of the kneading blades 13 to 16 and the inner surface of the chamber 3 forming the corresponding kneading space of the kneading chamber 2. However, if the height of the tip portion changes in the circumferential direction, the tip clearance shall be the narrowest portion of the gap.

Figure 5:
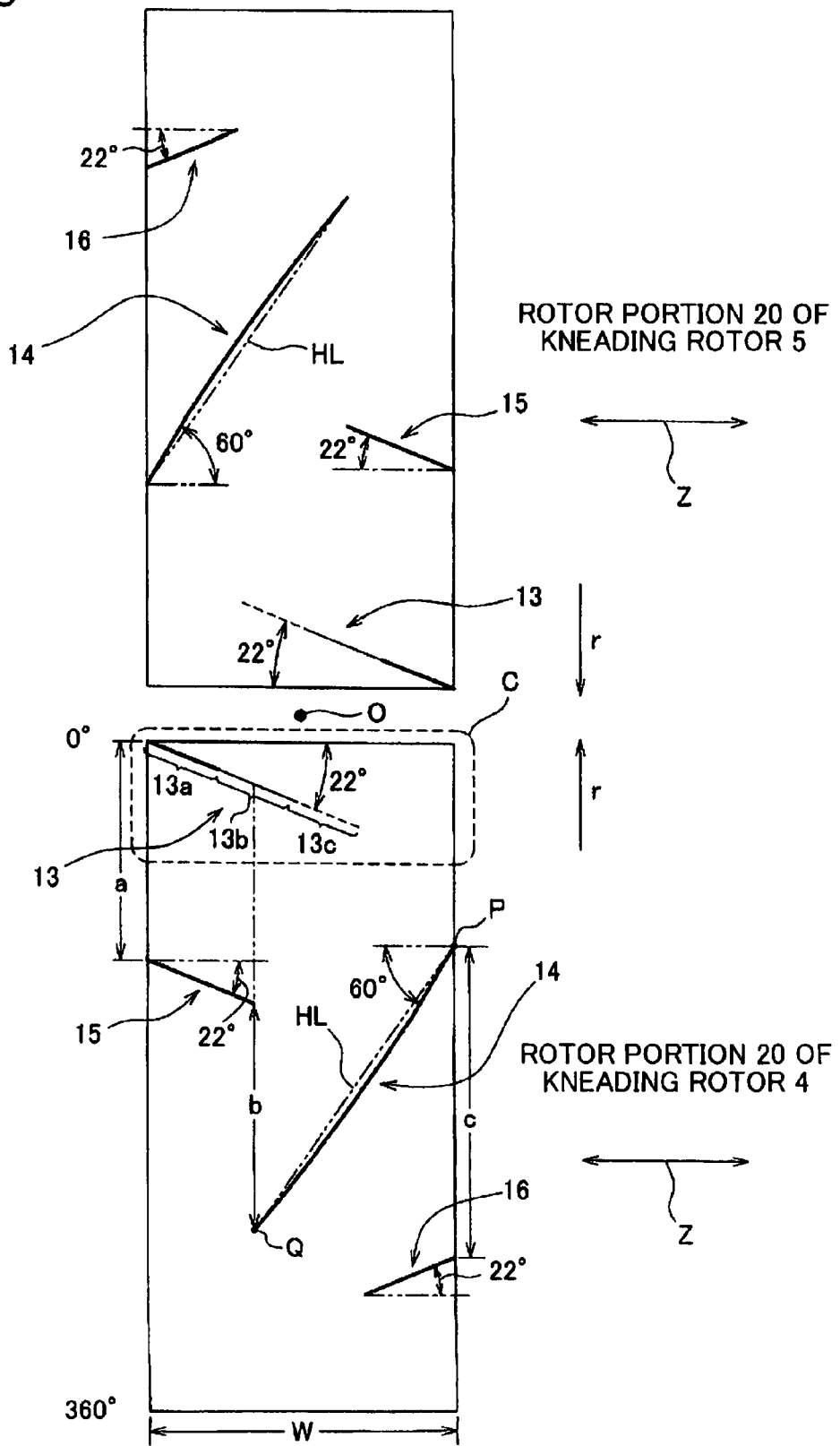
FIG. 5 is a development view around the axis of a rotor portion within the kneading rotor shown in FIG. 1.

In the developed shape in the case of developing the respective rotor portions 20 of the kneading rotors 4, 5 in a planar state around the axis, as shown in FIG. 5, the respective kneading blades 13 to 16 of the kneading rotors 4, 5 are arranged to be mutually point-symmetrical to the center point O. In the ensuing explanation, one kneading rotor 4 will be explained as a representative example of the kneading rotors 4, 5.

As shown in FIG. 2 to FIG. 5, the kneading rotor 4 has four kneading blades 13 to 16 on its rotor portion 20. The four kneading blades 13 to 16 are configured from a first long blade 13 and a second long blade 14 formed to have a length that is larger than half the length of the length W of the rotor portion 20 in the axial direction Z of that rotor portion 20, and a first short blade 15 and a second short blade 16 formed to have a length that is smaller than half the length of the length W of the rotor portion 20 in the axial direction Z of that rotor portion 20. In this embodiment, the lengths of the first long blade 13, the second long blade 14, the first short blade 15 and the second short blade 16 of the rotor portion 20 in the axial direction Z are 0.7 W, 0.65 W, 0.35 W and 0.3 W, respectively, in relation to the length W of the rotor portion 20.

(First Long Blade)

The first long blade 13 extends from one end of the rotor portion 20 in the axial direction Z as the part at which the blade is formed in the kneading rotor 4 toward the center side of the rotor portion 20 in the axial direction Z. Moreover, the first long blade 13 is a linear blade having a linear developed shape in the developed shape of the rotor portion 20 when the rotor portion 20 of the kneading rotor 4 is developed in a planar state around its axis. The first long blade 13 is formed in a spiral shape that is twisted at a twist angle of 22 degrees in a direction that enables the materials to be kneaded to flow to the center side of the rotor portion 20 in the axial direction Z in accordance with the axial rotation of the rotor portion 20.

The apex of the first long blade 13 is formed so as to become sequentially higher in three stages from one end side of the rotor portion 20 in the axial direction Z toward the center side of the rotor portion 20 in the axial direction Z. Specifically, the apex of the first long blade 13 is classified into a low tip portion 13a, a middle tip portion 13b that is higher than the low tip portion 13a, and a high tip portion 13c that is higher than the middle tip portion 13b. The low tip portion 13a, the middle tip portion 13b, and the high tip portion 13c are sequentially arranged from one end side of the rotor portion 20 in the axial direction Z toward the center side of the rotor portion 20 in the axial direction Z. Consequently, a large tip clearance L, a mid tip clearance M that is smaller than the large tip clearance L, and a small tip clearance S that is smaller than the mid tip clearance M are sequentially formed from one end side of rotor portion 20 in the axial direction Z toward the center side of the rotor portion 20 in the axial direction Z between the apex of the first long blade 13 and the opposite inner surface of the chamber 3, and the large tip clearance L, the mid tip clearance M and the small tip clearance S are arranged in the longitudinal direction of the first long blade 13. Specifically, three-staged tip clearances of different sizes are formed between the apex of the first long blade 13 and the opposite inner surface of the chamber 3 so as to be arranged in the longitudinal direction of the first long blade 13. The large tip clearance L is formed between the low tip portion 13a and the opposite inner surface of the chamber 3. The mid tip clearance M is formed between the middle tip portion 13b and the opposite inner surface of the chamber 3. The small tip clearance S is formed between the high tip portion 13c and the opposite inner surface of the chamber 3.

Here, the large tip clearance L is a tip clearance in which the ratio in relation to the inner diameter of the kneading space of the kneading chamber 2 is in the range of 0.0250 to 0.1000, the mid tip clearance M is a tip clearance in which said ratio is within the range of 0.0100 to 0.0500, and the small tip clearance S is a tip clearance in which said ratio is within the range of 0.0025 to 0.0250.

Figure 6:
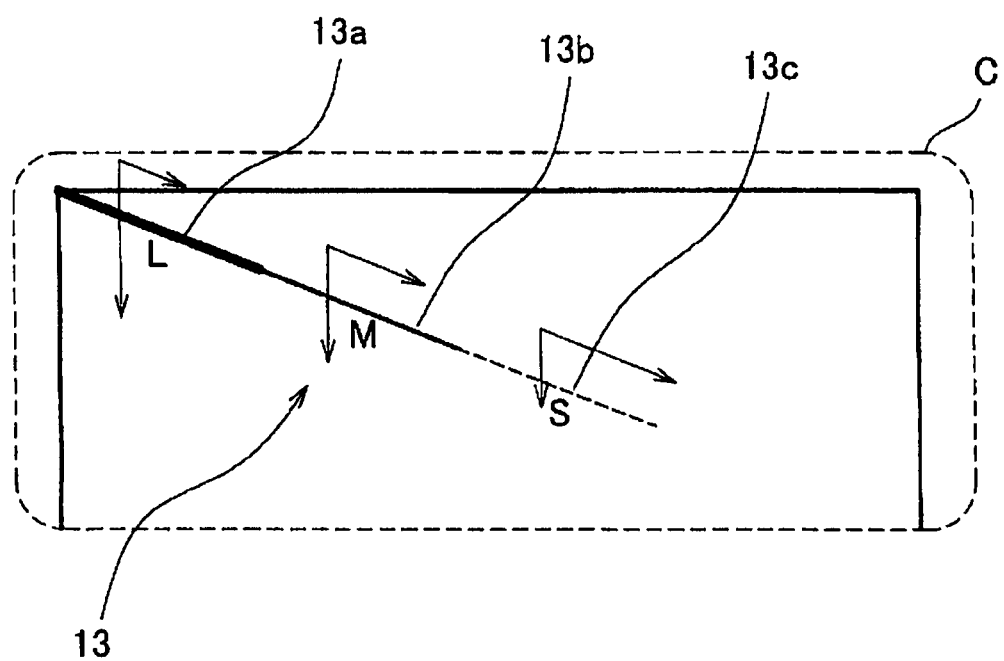
FIG. 6 is an enlarged view of the C portion of FIG. 5.

The arrows shown in FIG. 6 illustrate the flow of the materials to be kneaded around the first long blade 13, and, by setting the apex of the first long blade 13 to be different heights in three stages, the distribution amount (flow rate) of the materials to be kneaded toward the circumferential direction of the rotor portion 20 and the flow rate of the materials to be kneaded in the axial direction Z of the rotor portion 20 will change based on the respective tip portions 13a to 13c. Consequently, the flow of the materials to be kneaded within the kneading chamber 2 will become complex. The kneading of the materials to be kneaded is thereby promoted. In addition, since the shear force that is applied to the materials to be kneaded by the respective tip portions 13a to 13c will also differ, the kneading of the materials to be kneaded will also be promoted in this respect also.

Moreover, as a result of disposing the high tip portion 13c forming the small tip clearance S at the center side of the rotor portion 20 in the axial direction Z, it is possible to ensure the shear force to be applied to the materials to be kneaded as well as ensure the flowage of such materials to be kneaded in the axial direction Z of the rotor portion 20. Further, since the middle tip portion 13b and the low tip portion 13a arranged at one end side of the rotor portion 20 more in the axial direction Z than the high tip portion 13c will form the mid tip clearance M and the large tip clearance L, these tip portions 13b, 13c apply a relatively small shear force to the materials to be kneaded. Thus, high speed rotation of the kneading rotor 4 is enabled and, consequently, the powerful flow (flow in the circumferential direction and axial direction of the rotor portion 20) of the materials to be kneaded in the kneading chamber 2 is ensured. As described above, the kneading rotor 4 of this embodiment is able to ensure the shear force to be applied to the materials to be kneaded and improve the distribution performance (kneading performance) of the materials to be kneaded.

At the large tip clearance L formed with the low tip portion 13a, while the flow rate of the materials to be kneaded in the circumferential direction of the rotor portion 20 will increase, the flow rate of the materials to be kneaded in the longitudinal direction of the first long blade 13 or the axial direction Z of the rotor portion 20 will decrease. Moreover, at the mid tip clearance M formed with the middle tip portion 13b, while the flow rate of the materials to be kneaded in the circumferential direction of the rotor portion 20 will be medium, the flow rate of the materials to be kneaded in the longitudinal direction of the first long blade 13 or the axial direction Z of the rotor portion 20 will also become medium. Moreover, at the small tip clearance S formed with the high tip portion 13c, while the flow rate of the materials to be kneaded in the circumferential direction of the rotor portion 20 will decrease, the flow rate of the materials to be kneaded in the longitudinal direction of the first long blade 13 or the axial direction Z of the rotor portion 20 will increase.

The respective tip portions 13a to 13c are each formed to have a fixed height across the entire longitudinal direction thereof. Specifically, the apex of the first long blade 13 is formed from the respective tip portions (respective lands) formed horizontally in the longitudinal direction of the first long blade 13. In other words, the apex of the first long blade 13 is formed in a horizontal three-stage staircase pattern in the longitudinal direction of the first long blade 13. From the perspective of sufficiently promoting the kneading of the materials to be kneaded, although it is preferable to form the first long blade 13 in a staircase pattern as in this embodiment, this is not a necessity. For example, the apex of the first long blade may also be formed in a shape where the respective tip portions (respective lands) are inclined in relation to the longitudinal direction of the first long blade or the rotational direction of the first long blade.

(First Short Blade)

The first short blade 15 extends from one end of the rotor portion 20 in the axial direction Z toward the center side of the rotor portion 20 in the axial direction Z. Moreover, the first short blade 15 is a linear blade having a linear developed shape in the developed shape of the rotor portion 20. The first short blade 15 is formed in a spiral shape that is twisted at a twist angle of 22 degrees in a direction that enables the materials to be kneaded to flow to the center side of the rotor portion 20 in the axial direction Z in accordance with the axial rotation of the rotor portion 20. Moreover, the first short blade 15 is disposed behind the first long blade 13 in the rotational direction r of the rotor portion 20. Specifically, the first short blade 15 is formed by being shifted at a phase difference a=117 degrees in relation to the first long blade 13 at one end of the rotor portion 20 in the axial direction Z.

The apex 15a of the first short blade 15 is formed to have a fixed height. The tip clearance formed between the apex 15a of the first short blade 15 and the opposite inner surface of the chamber 3 is a size that corresponds to the mid tip clearance M.

Moreover, the length (0.35 W) of the first short blade 15 in the axial direction Z of the rotor portion 20 is larger than the length of the low tip portion 13a of the first long blade 13 in the axial direction Z. Consequently, it is possible to prevent the materials to be kneaded distributed in the circumferential direction of the rotor portion 20 with the part of the first long blade 13 positioned in the vicinity of one end of the rotor portion 20 in the axial direction Z from simply passing through in the circumferential direction of the rotor portion 20 through the tip clearance that is formed with the apex 15a of the first short blade 15. Specifically, in this embodiment, it is possible to use the first short blade 15 to effectively apply shear force to the materials to be kneaded distributed in the circumferential direction of the rotor portion 20 with the part of the first long blade 13 positioned in the vicinity of one end of the rotor portion 20 in the axial direction Z and, consequently, the kneading performance of the kneading rotor 4 can be improved.

(Second Long Blade)

The second long blade 14 extends from the other end of the rotor portion 20 in the axial direction Z toward the center side of the rotor portion 20 in the axial direction Z. Moreover, the second long blade 14 is formed as a nonlinear blade having a developed shape in which the twist angle gradually decreases from the other end side of the rotor portion 20 in the axial direction Z toward the center side of the rotor portion 20 in the axial direction Z in a developed shape of the rotor portion 20. Specifically, while the inclination angle of the part of the second long blade 14 positioned at the other end side of the rotor portion 20 in the axial direction Z is greater than the inclination angle of the hypothetical line HL connecting the starting point P and the ending point Q of the second long blade 14, the inclination angle of the part of the second long blade 14 positioned at the center side of the rotor portion 20 in the axial direction Z is smaller than the inclination angle of the hypothetical line HL. Moreover, the second long blade 14 is formed in a spiral shape that is twisted in a direction that enables the materials to be kneaded to flow toward the center side of the rotor portion 20 in the axial direction Z in accordance with the axial rotation of the rotor portion 20. Specifically, the second long blade 14 is twisted in the reverse direction in comparison to the first long blade 13. In addition, the phase difference b between the edge of the first short blade 15 positioned at the center side of the rotor portion 20 in the axial direction Z and the edge of the second long blade 14 positioned at the other end side of the rotor portion 20 in the axial direction Z is 121.5 degrees (approximately 122 degrees).

In this embodiment, the twist angle at the edge of the second long blade 14 positioned at the other end side of the rotor portion 20 in the axial direction Z is approximately 60 degrees. Although the flowage of the materials to be kneaded is difficult in the area of the kneading chamber 2 positioned around the end of the rotor portion 20 in the axial direction Z, as a result of the twist angle of the second long blade 14 at the other end of the rotor portion 20 being approximately 60 degrees, the distribution (flow) of the materials to be kneaded in the circumferential direction can be promoted around the other end of the rotor portion 20. Consequently, it is possible to prevent a part of the materials to be kneaded to become excessively overheated in the kneading chamber 2 and cause the quality to deteriorate. If the twist angle of the second long blade 14 at the other end of the rotor portion 20 is set to be 45 degrees or more, the distribution (flow) of the materials to be kneaded in the circumferential direction can be promoted. Moreover, since the twist angle of the part of the second long blade 14 positioned at the center side of the rotor portion 20 in the axial direction Z is smaller than the twist angle of the part of the second long blade 14 positioned at the other end side of the rotor portion 20 in the axial direction Z, the flow rate of the materials to be kneaded in the circumferential direction will decrease in comparison to the vicinity of the other end of the rotor portion 20 in the axial direction Z around the area near the center of the rotor portion 20 in the axial direction Z. Consequently, the shear force to be applied to the materials to be kneaded will increase at the area near the center of the rotor portion 20, and the flow of the materials to be kneaded in the axial direction Z of the rotor portion 20 will be promoted.

Moreover, the apex 14a of the second long blade 14 is formed to have a fixed height. The tip clearance formed between the apex 14a of the second long blade 14 and the opposite inner surface of the chamber 3 is a size that corresponds to the mid tip clearance M.

(Second Short Blade)

The second short blade 16 extends from the other end of the rotor portion 20 in the axial direction Z toward the center side of the rotor portion 20 in the axial direction Z. Moreover, the second short blade 16 is a linear blade having a linear developed shape in the developed shape of the rotor portion 20. The second short blade 16 is formed in a spiral shape that is twisted at a twist angle of 22 degrees in a direction that enables the materials to be kneaded to flow to the center side of the rotor portion 20 in the axial direction Z in accordance with the axial rotation of the rotor portion 20. Specifically, the second short blade 16 is twisted in the reverse direction in comparison to the first short blade 15. The second short blade 16 is disposed behind the second long blade 14 in the rotational direction r of the rotor portion 20. Specifically, the second short blade 16 is formed by being shifted at a phase difference c=169.5 degrees (approximately 170 degrees) in relation to the second long blade 14 at the other end of the rotor portion 20 in the axial direction Z.

The apex 16a of the second short blade 16 is formed to have a fixed height. The tip clearance formed between the apex 16a of the second short blade 16 and the opposite inner surface of the chamber 3 is a size that corresponds to the mid tip clearance M.

(Operation of Batch Kneader 1 (Material Kneading Method))

The operation of the batch kneader 1 is now explained with reference to FIG. 1. Foremost, the opening at the upper part of the chamber 3 is opened by separating the floating weight 8 from the chamber 3 in a state where the drop door 12 is placed closely to the chamber 3. The materials to be kneaded such as rubber containing silica, a silane coupling agent and other agent are filled in the chamber 3 (kneading chamber 2) from the material supply pipe 7 through the opening, and, by placing the floating weight 8 close to the chamber 3, the materials to be kneaded are pressured and sealed in the chamber 3 (kneading chamber 2).

Subsequently, the kneading rotors 4, 5 are mutually rotated in the reverse direction to start the kneading of the materials to be kneaded. Here, the kneading blades 13 to 16 of the rotor portion 20 of both kneading rotors 4, 5 apply shear force to the materials to be kneaded, disperse the materials to be kneaded, and thereby knead said materials. When the materials to be kneaded reach the intended kneaded state, the drop door 12 is separated from the chamber 3 and the outlet at the bottom part of the chamber 3 is released and the kneaded materials are discharged outside of the machine through the outlet.

(Experimental Results)

An experiment for checking the difference in performance between the batch kneader 1 comprising the kneading rotors 4, 5 and the batch kneader comprising the kneading rotor of the Comparative Example was conducted by operating these batch kneaders under the same conditions. In this experiment, used were materials to be kneaded to which silica was mixed to achieve PHR 80. Here, PHR (Parts per Hundred Rubber) refers to the parts by weight of the various compounding agents in relation to 100 parts by weight of rubber. FIG. 7 is a graph showing the kneading results of the kneading rotors 4, 5 of this embodiment and the kneading rotor of the Comparative Example. Table 1 shows the compounding of the materials to be kneaded which were used in this experiment.

TABLE 1

| ITEM | PHR |
|---|---|
| S-SBR | 96 |
| BR | 30 |
| SILLICA | 80 |
| SILANE COUPLING AGENT | 6.4 |
| ZnO | 3 |
| STEARIC ACID | 2 |
| AROMA OIL | 15 |
| ANTAGE 6PPD (PARA PHENYLENEDIAMINE) | 1.5 |
| ANTIOZONANT WAX | 1 |

S-SBR refers to solution polymerized styrene butadiene rubber. BR refers to butadiene rubber. Moreover, the kneading rotor (batch kneader) that was used in the Comparative Example was the kneading rotor (4) (batch kneader (1)) described in the Applicant's Japanese Patent No. 3980841 comprising one nonlinear blade and three linear blades as the kneading blades. In FIG. 7, the solid line shows the kneading result upon using the kneading rotors 4, 5 of this embodiment and the dotted line shows the kneading result upon using the kneading rotor of the Comparative Example. In FIG. 7, the $\Delta G'$ value is shown in the vertical axis of the graph and the temperature (discharge temperature) of the kneaded materials discharged from the outlet of the chamber is shown in the horizontal axis of the graph.

As evident from FIG. 7, when using the kneading rotors 4, 5 of this embodiment, high quality kneaded materials were obtained in the entire temperature range of approximately 150° C. to approximately 160° C. in comparison to the case of using the kneading rotor of the Comparative Example. Moreover, the higher the discharge temperature, the difference in performance between the kneading rotors 4, 5 of this embodiment and the kneading rotor of the Comparative Example increased. Specifically, in the kneading of materials to be kneaded containing (compounded with) large amounts of silica which required a high kneading temperature, if the kneading rotors 4, 5 of this embodiment are used, it has been discovered that higher quality kneaded materials can be obtained in comparison to the case of using a conventional kneading rotor (kneading rotor of the Comparative Example). Incidentally, when the discharge temperature was 157° C. or higher with the kneading rotor of the Comparative Example, the kneaded materials were partially burned and favorable kneaded materials could not be obtained.

With the kneading rotors 4, 5 of this embodiment, the apex of one first long blade 13 forms the three-staged tip clearances L, M, S of different sizes so as to be arranged in the longitudinal direction of the first long blade 13, and the apexes of the other three kneading blades 14 to 16 form tip clearances in a size corresponding to the mid tip clearance M formed by the middle tip portion 13b of the apex of the first long blade 13. Thus, the flow of the materials to be kneaded can be made complex within the kneading chamber 2 while applying the same level of shear force as conventional technologies to the materials to be kneaded. Consequently, with this embodiment, as shown in FIG. 7, it is possible to obtain kneaded materials with higher quality in comparison to conventional kneaded materials when the materials to be kneaded are kneaded in a high temperature state.

Moreover, in this embodiment, the low tip portion 13a of the apex of the first long blade 13 positioned at one end side of the rotor portion 20 in the axial direction Z forms the large tip clearance L that is larger than the small tip clearance S at a position that is nearest from one end of the rotor portion 20 in the axial direction Z. Consequently, although it is difficult for the materials to be kneaded to flow in the area around the end of the rotor portion 20 in the axial direction Z within the kneading space of the kneading chamber 2, according to this configuration, the distribution (flow) of the materials to be kneaded in the circumferential direction in the foregoing area can be promoted. Thus, it is possible to prevent a part of the materials to be kneaded to become excessively overheated and cause the quality to deteriorate. Incidentally, the tip portion of the apex of the first long blade 13 that is positioned at one end side of the rotor portion 20 in the axial direction Z may be the middle tip portion 13b forming the mid tip clearance M.

Moreover, in this embodiment, the high tip portion 13c of the apex of the first long blade 13 that is positioned at the center side of the rotor portion 20 in the axial direction Z forms the small tip clearance S that is smaller than the large tip clearance L at a position that is nearest from the center of the rotor portion 20 in the axial direction Z. Consequently, the flowage of the materials to be kneaded toward the other end side of the rotor portion 20 in the axial direction Z can be promoted in the area near the center of the rotor portion 20 in the axial direction Z. Thus, by using in a broad range the second long blade 14 that is arranged behind the high tip portion 13c in the rotational direction r of the rotor portion 20 and that extends from the other end side to the center side of the rotor portion 20 in the axial direction Z, it is possible to effectively apply shear force to the materials to be kneaded which is promoted to flow toward the other end side of the rotor portion 20 by the high tip portion 13c.

Incidentally, the tip portion of the apex of the first long blade 13 that is positioned at the center side of the rotor portion 20 in the axial direction Z may also be the middle tip portion 13b forming the mid tip clearance M. Nevertheless, a more desirable mode is a mode where, as in this embodiment, the apex of the first long blade 13 is formed so as to sequentially form the tip clearances L, M, S from one end side toward the center side of the rotor portion 20 in the axial direction Z. In this embodiment, as a result of this configuration, the high tip portion or the high tip portion and the middle tip portion will be positioned near the center part of the rotor portion 20 in the axial direction Z. Consequently, it is possible to obtain an additional effect of being able to promote the biting of the materials to be kneaded with the rotor portion 20 immediately after they are injected into the kneading chamber 2.

Moreover, in this embodiment, since the second long blade 14 is formed as a nonlinear blade in which the twist angle gradually decreases from the other end side of the rotor portion 20 in the axial direction Z toward the center side of the rotor portion 20 in the axial direction Z, the distribution of the materials to be kneaded toward the circumferential direction of the rotor portion 20 will be promoted as said materials head toward the center side of the rotor portion 20 in the axial direction Z. Further, in this embodiment, the first long blade 13, the first short blade 15, and the second short blade 16 are formed to have a twist angle of 22 degrees capable of maintaining a favorable balance between the distribution of materials in the circumferential direction of the rotor portion 20 and the flowage of materials in the axial direction Z of the rotor portion 20. Consequently, it is possible to broaden the temperature range of the materials to be kneaded from a low temperature range in which kneading was conventionally possible to a high temperature range in which sufficient kneading was conventionally difficult, and the quality of the kneaded materials after being kneaded in the foregoing broad temperature range can be improved.

Although the embodiments of the present invention were described above, this invention is not limited to said embodiments, and may be variously modified and worked within the scope of the claimed invention.

For example, although the apex of the first long blade 13 is formed in a shape so as to form three-staged tip clearances of different sizes in the order of tip clearances L, M, S from one end side of the rotor portion 20 in the axial direction Z toward the center side of the rotor portion 20 in the axial direction Z, the order of the tip clearances to be formed by the apex of the first long blade 13 is not limited thereto. For example, the apex of the first long blade 13 may also form the tip clearances in the order of tip clearances L, S, M or in the order of tip clearances M, L, S from one end side of the rotor portion 20 in the axial direction Z toward the center side of the rotor portion 20 in the axial direction Z. What is important here is that the three-staged tip clearances are formed so that the tip clearance that is first (initially) formed from one end side of the rotor portion 20 in the axial direction Z is formed to be smaller than the tip clearance that is formed as the third tip clearance from one end side of the rotor portion 20 in the axial direction Z (tip clearance that is formed nearest to the center side of the rotor portion 20 in the axial direction Z).

In addition, the apex of at least one kneading blade among the kneading blades 14 to 16 other than the first long blade 13 may be formed in a shape of forming a multi-staged tip clearance between the apex and the opposite inner surface of the chamber 3. Consequently, it will be possible to further complicate the flow of the materials to be kneaded in the kneading chamber. Moreover, the second long blade 14 may also be a linear blade. The second long blade 14 may also be a nonlinear long blade and in which the apex thereof is formed in a shape that forms three-staged tip clearances.

Further, the size of the tip clearance formed by the apexes of the three kneading blades 14 to 16 should be of a size that is larger than or equal to the small tip clearance S and smaller than or equal to the large tip clearance L formed by the apex of the first long blade 13. If the apexes of the kneading blades 14 to 16 are formed so as to form a tip clearance that is larger than the large tip clearance L, the amount of materials to be kneaded that will pass through in the circumferential direction of the rotor portion 20 will increase excessively and, consequently, appropriate shear force cannot be applied to the materials to be kneaded. Meanwhile, if the apexes of the kneading blades 14 to 16 are formed so as to form a tip clearance that is smaller than the small tip clearance S, the distributivity of the materials to be kneaded will deteriorate and, consequently, high quality kneaded materials cannot be obtained when the materials to be kneaded are kneaded in a high temperature state.

Moreover, in the foregoing embodiments, although the twist angle of the three kneading blades 13, 15, 16 excluding the second long blade 14 is set to be 22 degrees, this twist angle may be any angle within the range of 15 degrees to 35 degrees. According to the foregoing configuration, balance can be maintained between the distribution of the materials to be kneaded in the circumferential direction of the rotor portion 20 and the flowage of the materials to be kneaded in the axial direction Z of the rotor portion 20.

Although the foregoing embodiment illustrated a non-engaging (tangent) kneading rotor (kneader), the present invention can also be applied to a uniaxial-type kneading rotor (kneader).

Summary of Embodiments

The embodiments can be summarized as follows.

Specifically, the kneading rotor according to this embodiment is a kneading rotor inserted rotatably into a kneading chamber of a chamber of a batch kneader, and comprises a rotor portion which has a plurality of kneading blades on its peripheral surface, is disposed in the kneading chamber so as to form a tip clearance between apexes of the kneading blades and an inner surface of the chamber forming the kneading chamber, and applies shear force, by using the kneading blades, to materials to be kneaded which pass through the tip clearance. With this kneading rotor, the plurality of kneading blades include a first long blade and a second long blade having a length that is larger than half the length of the rotor portion in the axial direction of that rotor portion and twisted in a mutually reverse direction and in a direction that enables materials to be kneaded to flow toward the center side of the rotor portion in the axial direction in accordance with the axial rotation of the rotor portion, and a first short blade and a second short blade having a length that is smaller than half the length of the rotor portion in the axial direction of that rotor portion and twisted in a mutually reverse direction and in a direction that enables materials to be kneaded to flow toward the center side of the rotor portion in the axial direction in accordance with the axial rotation of the rotor portion. Moreover the first short blade is a linear blade that is disposed behind the first long blade in the rotational direction of the rotor portion, and has a developed shape of extending from one end side of the rotor portion in the axial direction to the center side of that rotor portion in the axial direction in a developed shape of the rotor portion in a case where that rotor portion is developed in a planar state around its axis. Further, the second short blade is a linear blade that is disposed behind the second long blade in the rotational direction of the rotor portion, and has a developed shape of extending from the other end side of the rotor portion in the axial direction to the center side of that rotor portion in the axial direction in the developed shape of the rotor portion. In addition, the first long blade has an apex for forming, with the inner surface of the chamber forming the kneading chamber, three-staged tip clearances of different sizes configured from a combination of a large tip clearance, a mid tip clearance that is smaller than the large tip clearance, and a small tip clearance that is smaller than the mid tip clearance so as to be arranged in the longitudinal direction of the first long blade. Moreover, each of the second long blade, the first short blade and the second short blade has an apex for forming, with the inner surface of the chamber forming the kneading chamber, a tip clearance of a size that is larger than or equal to the small tip clearance and smaller than or equal to the large tip clearance.

According to this configuration, since the apex of one long blade (first long blade) forms the three-staged tip clearances of different sizes so as to be arranged in the longitudinal direction of the long blade, and the apexes of the other kneading blades form tip clearances of a size that is larger than or equal to the small tip clearance and smaller than or equal to the large tip clearance formed by the apex of the foregoing long blade, the flow of the materials to be kneaded can be made complex within the kneading chamber while applying the same level of shear force as conventional technologies to the materials to be kneaded. Specifically, according to this configuration, the distribution of the materials to be kneaded can be promoted while applying the same level of shear force as conventional technologies to such materials to be kneaded. Consequently, it is possible to obtain kneaded materials with higher quality in comparison to conventional kneaded materials when the materials to be kneaded are kneaded in a high temperature state. Here, the expression "apex of the kneading blade" refers to the tip portion (also known as a land) of the kneading blade which is formed on a face opposite the inner surface of the chamber forming the kneading chamber. Moreover, the term "tip clearance" refers to the gap between the tip portion (apex of the kneading blade) and the inner surface of the chamber forming the kneading chamber.

Incidentally, when the apexes of the other kneading blades other than the first long blade form tip clearances that are larger than the large tip clearance between the apexes and the opposite inner surface of the chamber, the amount of the materials to be kneaded that will pass through in the circumferential direction of the rotor portion will become too large, and consequently it will not be possible to apply appropriate shear force to the materials to be kneaded. Moreover, when the apexes of the other kneading blades form tip clearances that are smaller than the small tip clearance between the apexes and the opposite inner surface of the chamber, heat generation will occur locally and the distributivity of the material will deteriorate. Consequently, it will not be possible to obtain kneaded materials with high quality when the materials to be kneaded are kneaded in a high temperature state.

Moreover, with the kneading rotor described above, preferably, the apex of the first long blade forms a tip clearance that is larger than the small tip clearance among the three-staged tip clearances, at a position that is nearest from one end of the rotor portion in the axial direction.

Although it is difficult for the materials to be kneaded to flow in the area around the edge of the rotor portion in the axial direction within the kneading chamber, according to this configuration, the distribution (flow) of the materials to be kneaded in the circumferential direction in the foregoing area can be promoted. Thus, it is possible to prevent apart of the materials to be kneaded to become excessively overheated and cause the quality to deteriorate.

Moreover, with the kneading rotor described above, preferably, the apex of the first long blade forms a tip clearance that is smaller than the large tip clearance among the three-staged tip clearances, at a position that is nearest from the center of the rotor portion in the axial direction.

According to this configuration, the flowage of the materials to be kneaded toward the other end side of the rotor portion in the axial direction can be ensured around the part of the first long blade that is nearest from the center of the rotor portion in the axial direction. Thus, it is possible to effectively apply shear force to the materials to be kneaded which the flowage thereof was promoted with the first long blade, by using the second long blade which is arranged at a distance from the first long blade of the rotor portion in the circumferential direction, in a broad range.

Moreover, with the kneading rotor described above, preferably, the apex of the first long blade forms tip clearances sequentially in the order of the large tip clearance, the mid tip clearance, and the small tip clearance from one end side of the rotor portion in the axial direction toward the center side of the rotor portion in the axial direction.

According to this configuration, since a relatively small tip clearance will be formed at the center side of the rotor portion in the axial direction, it is possible to promote the biting of the materials to be kneaded with the rotor portion immediately after they are injected into the kneading chamber and further activate the flow of the materials to be kneaded in the kneading chamber.

Moreover, with the kneading rotor described above, preferably, the second long blade is formed so that the twist angle in an edge of that second long blade positioned at the other end side of the rotor portion in the axial direction is 45 degrees or more.

According to this configuration, the distribution (flow) of the materials to be kneaded in the circumferential direction can be promoted in an area where the flowage of the materials to be kneaded is difficult; specifically, the area located in the kneading chamber around the edge of the rotor portion in the axial direction. Thus, it is possible to prevent a part of the materials to be kneaded to become excessively overheated and cause the quality to deteriorate.

Moreover, with the kneading rotor described above, preferably, the length of the first short blade in the axial direction of the rotor portion is larger than or equal to the length, in the axial direction of the rotor portion, of a part of the apex of the first long blade forming a tip clearance that is positioned nearest to one end of the rotor portion in the axial direction among the three-staged tip clearances, and the apex of the first short blade forms, with the inner surface of the chamber, a tip clearance of a size that is smaller than or equal to a tip clearance which is formed nearest from one end of the rotor portion in the axial direction by the first long blade.

According to this configuration, it is possible to prevent the materials to be kneaded distributed in the circumferential direction of the rotor portion with the part of the first long blade positioned in the vicinity of one end of the rotor portion in the axial direction from simply passing through in the circumferential direction of the rotor portion through the tip clearance that is formed with the apex of the first short blade. Specifically, according to this configuration, by using the first short blade, it is possible to effectively apply shear force to the materials to be kneaded distributed in the circumferential direction of the rotor portion with the part of the first long blade positioned in the vicinity of one end of the rotor portion in the axial direction. Consequently, the kneading effect of the materials to be kneaded can be improved.

Moreover, with the kneading rotor described above, preferably, the second long blade is formed as a nonlinear blade having a developed shape in which the twist angle gradually decreases from the other end side of the rotor portion in the axial direction toward the center side of the rotor portion in the axial direction in the developed shape of the rotor portion, and the first long blade, the first short blade and the second short blade are respectively formed so that the twist angles thereof are 15 degrees or more and 35 degrees or less.

According to this configuration, the distribution of the materials to be kneaded in the circumferential direction of the rotor portion can be promoted using the second long blade. Thus, it is possible to broaden the temperature range of the materials to be kneaded from a low temperature range in which kneading was conventionally possible to a high temperature range in which kneading was conventionally difficult, and the quality of the kneaded materials after being kneaded in the foregoing broad temperature range can be improved.

Moreover, with the kneading rotor described above, preferably, the apex of at least one kneading blade among the second long blade, the first short blade and the second short blade forms multi-staged tip clearances of different sizes including the large tip clearance, the mid tip clearance and the small tip clearance so as to be arranged in the longitudinal direction of the kneading blade.

Moreover, the batch kneader according to the foregoing embodiment is a non-engaging batch kneader comprising a pair of the kneading rotors according to any one of the foregoing configurations, wherein both kneading rotors are disposed so as not to engage with each other.

According to this batch kneader, it is possible to obtain kneaded materials with higher quality in comparison to conventional kneaded materials when the materials to be kneaded are kneaded in a high temperature state.

Moreover, the method of kneading materials according to the foregoing embodiment uses the foregoing batch kneader to knead materials to be kneaded containing silica and a silane coupling agent.

According to this configuration, it is possible to improve the quality of the kneaded materials obtained by kneading materials to be kneaded to which large amounts of silica are added (compounded) thereto in comparison to conventional kneaded materials.

The invention claimed is:

1. A kneading rotor inserted rotatably into a kneading chamber of a chamber of a batch kneader, comprising:
a rotor portion which has a plurality of kneading blades on its peripheral surface, is disposed in the kneading chamber so as to form a tip clearance between apexes of the kneading blades and an inner surface of the chamber forming the kneading chamber, and applies shear force, by using the kneading blades, to materials to be kneaded which pass through the tip clearance,
wherein the plurality of kneading blades include a first long blade and a second long blade having a length that is larger than half the length of the rotor portion in the axial direction of that rotor portion and twisted in a mutually reverse direction and in a direction that enables materials to be kneaded to flow toward the center side of the rotor portion in the axial direction in accordance with the axial rotation of the rotor portion, and a first short blade and a second short blade having a length that is smaller than half the length of the rotor portion in the axial direction of that rotor portion and twisted in a mutually reverse direction and in a direction that enables materials to be kneaded to flow toward the center side of the rotor portion in the axial direction in accordance with the axial rotation of the rotor portion,
wherein the first short blade is a linear blade that is disposed behind the first long blade in the rotational direction of the rotor portion, and has a developed shape of extending from one end side of the rotor portion in the axial direction to the center side of that rotor portion in the axial direction in a developed shape of the rotor portion in a case where that rotor portion is developed in a planar state around its axis,
wherein the second short blade is a linear blade that is disposed behind the second long blade in the rotational direction of the rotor portion, and has a developed shape of extending from the other end side of the rotor portion in the axial direction to the center side of that rotor portion in the axial direction in the developed shape of the rotor portion,
wherein the second long blade is formed so that the twist angle in an edge of that second long blade positioned at the other end side of the rotor portion in the axial direction is 45 degrees or more,
wherein the first long blade is formed so that the twist angle thereof is 15 degrees or more and 35 degrees or less, and has an apex for forming, with the inner surface of the chamber forming the kneading chamber, three-staged tip clearances of different sizes configured from a combination of a large tip clearance, a mid tip clearance that is smaller than the large tip clearance, and a small tip clearance that is smaller than the mid tip clearance so as to be arranged in the longitudinal direction of the first long blade,
wherein each of the second long blade, the first short blade and the second short blade has an apex for forming, with the inner surface of the chamber forming the kneading chamber, a tip clearance of a size that is larger than or equal to the small tip clearance and smaller than or equal to the large tip clearance,
wherein the apex of the first long blade forms tip clearances sequentially in one of the order of: the large tip clearance, the mid tip clearance and the small tip clearance, the large tip clearance, the small tip clearance and the mid tip clearance, or the mid tip clearance, the large tip clearance and the small tip clearance, from one end side of the rotor portion in the axial direction toward the center side of the rotor portion in the axial direction,
wherein the length of the first short blade in the axial direction of the rotor portion is larger than or equal to the length, in the axial direction of the rotor portion, of a part of the apex of the first long blade forming a tip clearance that is positioned nearest to one end of the rotor portion in the axial direction among the three-staged tip clearances, and wherein the apex of the first short blade forms, with the inner surface of the chamber, a tip clearance of a size that is smaller than or equal to a tip clearance which is formed nearest from one end of the rotor portion in the axial direction by the first long blade.

2. The kneading rotor according to claim 1, wherein the apex of the first long blade forms a tip clearance that is larger than the small tip clearance among the three-staged tip clearances, at a position that is nearest from one end of the rotor portion in the axial direction.

3. The kneading rotor according to claim 1, wherein the apex of the first long blade forms a tip clearance that is smaller than the large tip clearance among the three-staged tip clearances, at a position that is nearest from the center of the rotor portion in the axial direction.

4. The kneading rotor according to claim 1, wherein the second long blade is formed as a nonlinear blade having a developed shape in which the twist angle gradually decreases from the other end side of the rotor portion in the axial direction toward the center side of the rotor portion in the axial direction in the developed shape of the rotor portion, and wherein the first short blade and the second short blade are respectively formed so that the twist angles thereof are 15 degrees or more and 35 degrees or less.

5. The kneading rotor according to claim 1, wherein the apex of at least one kneading blade among the second long blade, the first short blade and the second short blade forms multi-staged tip clearances of different sizes including the large tip clearance, the mid tip clearance and the small tip clearance so as to be arranged in the longitudinal direction of the kneading blade.

6. A non-engaging batch kneader, comprising a pair of the kneading rotors according to claim 1, wherein both kneading rotors are disposed so as not to engage with each other.

* * * * *